April 25, 1933. W. A. BOLLINGER 1,905,550
HEATING APPARATUS
Filed July 8, 1931
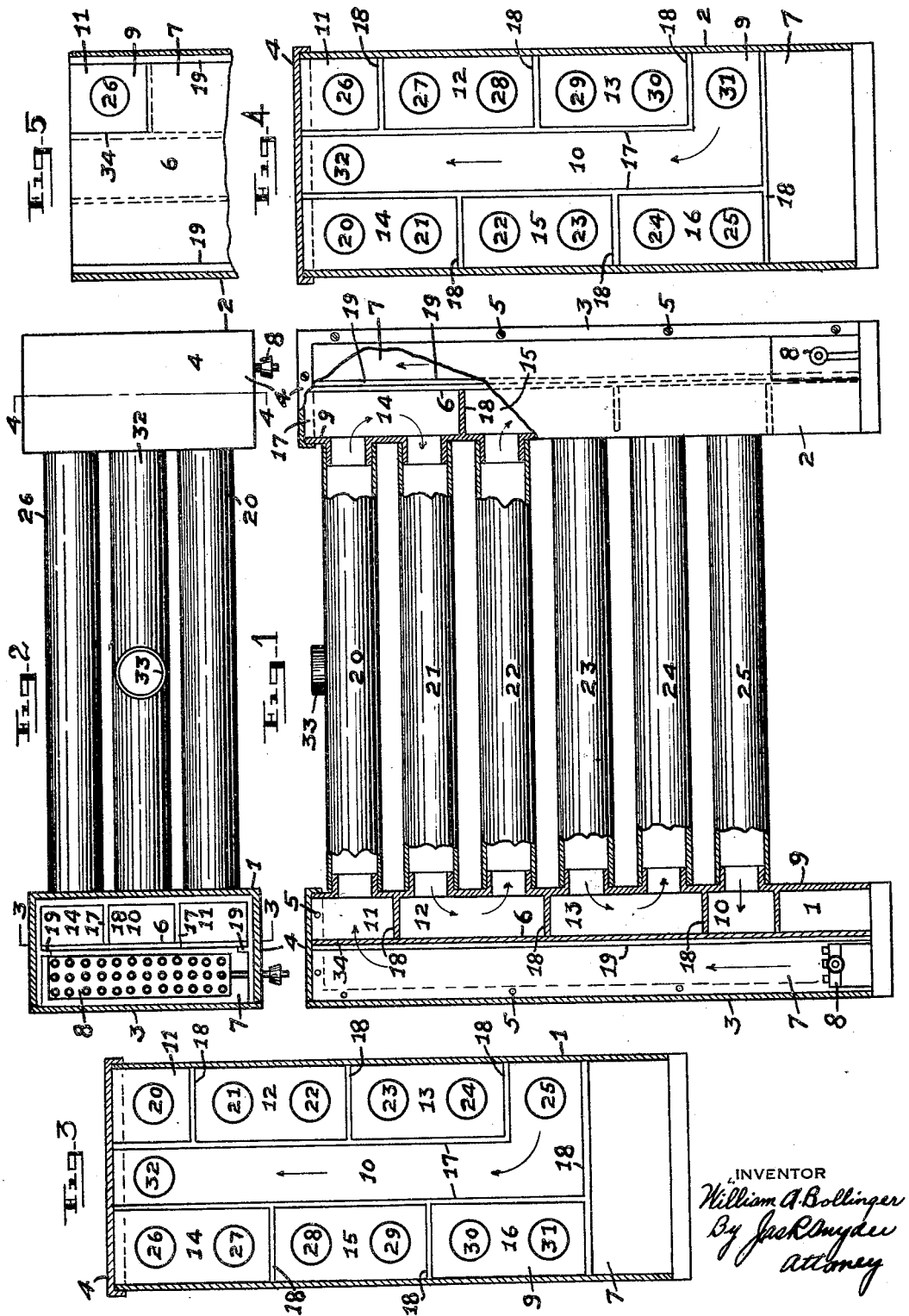
INVENTOR
William A. Bollinger
By Jack Snyder
attorney Patented Apr. 25, 1933

1,905,550

UNITED STATES PATENT OFFICE

WILLIAM A. BOLLINGER, OF PITTSBURGH, PENNSYLVANIA

HEATING APPARATUS

Application filed July 8, 1931. Serial No. 549,407.

My invention relates to a heating apparatus, and while primarily intended for heating apparatus of the hot air type, it will be obvious that the invention may be embodied in any other type of heating apparatus wherein it is found to be applicable.

Important objects of the invention are to provide a heating apparatus of the character described, which will greatly increase the heat supply on the same fuel consumption by utilizing and consuming the products of combustion while passing the latter from the combustion chambers to the flue or chimney; which may be readily connected to heating units already installed as well as form a component part of a new heating system; and which functions most efficiently by drawing the products of combustion through a series of conduits from the upper to the lower part of the structure and by maintaining the products of combustion at a nearly uniform high temperature during its travel through a series of conduits.

Further objects of the invention are to provide a device of the class stated, which is simple in its construction and arrangement, durable, compact, attractive in appearance, and comparatively inexpensive to manufacture, install and operate.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawing wherein like numerals of reference designate corresponding parts throughout the several views:—

Figure 1 is a front elevational view, partly in cross section, of a heating apparatus constructed in accordance with the invention.

Figure 2 is a top plan view thereof partly in cross section.

Figure 3 is a sectional view on line 3—3, Figure 2.

Figure 4 is a sectional view on line 4—4, Figure 2.

Figure 5 is a fragmentary side view of the division wall, and of associated parts.

Referring in detail to the drawing, 1 and 2 respectively denote a pair of rectangularly shaped and vertically disposed end casings. Each of the end casings 1 and 2 preferably includes a removable outer side wall 3 and top 4, which may be secured in position by means of screws 5, or in any other suitable manner.

A vertically disposed division wall 6 extends from the top to the bottom of each of the end casings 1 and 2. The space between the outer side wall 3 and the division wall 6 constitutes the combustion chamber 7, which extends throughout the height of respective end casings 1 and 2. A burner element 8 is mounted in the bottom of each combustion chamber 7, and while these elements as illustrated, are adapted for gas fuel, it is apparent that the construction of the combustion chambers and burner elements may be such as to render the same adaptable for the consumption of coal, oil or any other fuel.

The space between the division wall 6 and the inner wall 9 of each of the end casings 1 and 2 is divided into a plurality of separate compartments, respectively indicated at 10, 11, 12, 13, 14, 15 and 16 by the pair of vertically extending partitions 17 and the plurality of horizontally disposed partitions 18.

The end casings 1 and 2 are identical to each other in construction except that in the end casing 1, the compartments 11, 12 and 13 are disposed at the front, and the compartments 14, 15 and 16 are disposed at the rear, while in the end casing 2 the compartments 14, 15 and 16 are disposed at the front, and the compartments 11, 12 and 13 are disposed at the rear. The compartments 10 constitute draft passages and are disposed between the front and rear compartments, and extend throughout the heights of the latter.

The division walls 6 constitute the outer side walls of the compartments and the inner side walls for the combustion chambers 7. The division walls 6 are preferably removably mounted in respective end casings 1 and 2, and are maintained in position between the outer edges of the partitions 17 and 18 and a pair of fixed guides 19 provided therefor in each of the casings 1 and 2.

A plurality of horizontally extending conductor pipes are joined with the end casings 1 and 2 to communicate with the respective compartments 10, 11, 12, 13, 14, 15 and 16 in the following manner: The conductor pipe 20 connects with the top compartments 11 of the end casing 1 and with the top compartment 14 of the end casing 2; the conductor pipe 21 connects with the compartment 12 of the end casing 1 and with the compartment 14 of the end casing 2; the conductor pipe 22 connects with the compartment 12 of the end casing 1 and with the compartment 15 of the end casing 2; the conductor pipe 23 connects with the compartment 13 of the end casing 1 and with the compartment 15 of the end casing 2; the conductor pipe 24 connects with the compartment 13 of the end casing 1 and with the compartment 16 of the end casing 2; and the conductor pipe 25 connects with the lower end of the compartment 10 of the end casing 1 and with the compartment 16 of the end casing 2.

In like manner, the conductor pipe 26 connects with the top compartment 11 of the end casing 2 and with the top compartment 14 of the end casing 1; the conductor pipe 27 connects with the compartment 12 of the end casing 2 and with the compartment 14 of the end casing 1; the conductor pipe 28 connects with the compartment 12 of the end casing 2 and with the compartment 15 of the end casing 1; the conductor pipe 29 connects with the compartment 13 of the end casing 2 and with the compartment 15 of the end casing 1; the conductor 30 connects with the compartment 13 of the end casing 2 and with the compartment 16 of the end casing 1; and the compartment 31 connects with the lower end of the compartment 10 of the end casing 2 and with the compartment 16 of the end casing 1.

The conductor pipes 20, 21, 22, 23, 24 and 25 are arranged in superposed parallel relation to each other at the front of the structure in the sequence enumerated, and the conductor pipes 26, 27, 28, 29, 30 and 31 are likewise arranged at the rear of the structure and spaced from the said front conductor pipes. The front and rear series of conductor pipes constitute radiator manifolds for the radiation of heat during the operation of the heating apparatus.

A flue pipe 32 is disposed between and parallel to the upper conductor pipes 20 and 26, and communicably connects with the upper end of the compartment 10 of the end casing 1 and with the upper end of the compartment 10 of the end casing 2. The flue pipe 32 is provided with a neck 33 adapted for connecting with a suitable conduit leading to a stack or chimney.

The division wall 6 is provided with a cut out top corner as indicated at 34, whereby the compartments 11 of the end casings 1 and 2 have no outer wall but open directly into the combustion chambers 7 of respective end casings 1 and 2.

In the end casing 1 the products of combustion will travel upwardly in the combustion chamber 7, pass through the cut out corner 34 of the division wall 6 and enter the conductor pipe 20. The products of combustion will travel back and forth through the front conductor pipes 20, 21, 22, 23, 24 and 25. Upon leaving the conductor pipe 25 the products of combustion travel upwardly through the compartment 10 in the end casing 1 and enter the flue pipe 32 to be dissipated in the chimney communicably joined with the latter.

In the end casing 2 the products of combustion will travel through the rear conductor pipes 26, 27, 28, 29, 30 and 31 in identically the same manner to that described relatively to the front conductor pipes, except that the products of combustion will travel in the opposite directions in corresponding conductor pipes. The path of travel of the products of combustion are clearly indicated by arrows in Figures 1, 3 and 4.

A feature of the present invention is that the products of combustion are passed from the upper to the lower part of the structure through the series of conductor pipes. Extensive experimentation has conclusively proven that such arrangement is most effective in producing the maximum of heat on a minimum consumption of fuel.

The efficiency of the structure is further enhanced by the arrangement of the combustion chamber 7, as the inner walls 6 of the latter constitute the outer wall of the associated compartments, and in consequence the products of combustion in passing through the latter are subjected to intense heat and maintained at a uniformly high temperature until finally dissipated through the flue pipe 32. By providing two combustion chambers 7 at respective ends of the conductor pipes the heating capacity of the structure is increased many times in respect to a structure in which but one combustion chamber is employed.

The compartments 10 of the end casings 1 and 2 constitute draft passages, and as said compartments 10 are directly subjected to intense heat from the combustion chambers 7, draft action will be stimulated for drawing the products of combustion through the series of conductor pipes. The products of combustion enter the top conductor pipes 20 and 26 from the top of the combustion chambers 7 of respective end casings 1 and 2, and are expelled from the lower conductor pipes 25 and 31 into the lower ends of the compartments 10 or respective end casings 1 and 2.

Each series of front and rear conductor pipes provides a separate continuous conduit from the upper end of respective combustion chambers 7 to the lower end of respective compartments 10 and while such downward travel of the products of combustion is against the natural flow of the latter, the draft action provided will cause the unretarded travel of the products through the series of conductor pipes in the manner illustrated and described.

It will here be noted that the arrangement, configuration and number of conductor pipes embodied in my improved heating apparatus may be widely varied to meet conditions found in practice. The structure is preferably constructed from sheet material of a metal best suited for heat radiation. The device may or may not be inclosed in a jacket depending upon whether the device be utilized for local or remote heat distribution.

The present invention provides a most efficient heating apparatus, having an exceptionally larger radiating surface, and which will function to produce a relatively high heating capacity on minimum fuel consumption.

What I claim is:

1. In a heating apparatus, an end casing, partition walls mounted in said end casing and dividing the latter into a combustion chamber and a draft chamber, and a radiator manifold providing a continuous passage having its inlet communicably joined with the upper end of said combustion chamber, the outlet of said radiator manifold being communicably joined with the lower end of said draft chamber.

2. In a heating apparatus, a vertical end casing, partition walls mounted in said end casing and dividing the latter into a combustion chamber and a draft chamber, and a horizontally extending radiator manifold providing a continuous passage, the inlet of said passage opening into the upper end of said combustion chamber, and the outlet of said passage opening into the lower end of said draft chamber.

3. In a heating apparatus, a vertical end casing, partition walls mounted in said end casing and dividing the latter into a combustion chamber and a draft chamber, and a horizontally extending radiator manifold providing a continuous passage, the inlet of said passage opening into the upper end of said combustion chamber, and the outlet of said passage opening into the lower end of said draft chamber, said combustion chamber and said draft chamber extending vertically throughout the height of said end casing.

4. In a heating apparatus, a pair of end casings, partition walls mounted in said pair of end casings and dividing each of the latter to provide a combustion chamber and a draft chamber, a pair of radiator manifolds supported by and between said pair of end casings and providing continuous passages, the inlet of each of said passages opening into the upper end of respective combustion chambers, and the outlet of each of said passages opening into the lower end of respective draft chambers.

5. In a heating apparatus, a pair of vertical disposed end casings, partition walls mounted in said pair of end casings and dividing each of the latter to provide a combustion chamber and a draft chamber, a pair of horizontally extending radiator manifolds supported by and between said pair of end casings and providing continuous passages, the inlet of each of said passages opening into the upper end of respective combustion chambers, and the outlet of each of said passages opening into the lower end of respective draft chambers.

6. In a heating apparatus, a pair of vertical disposed end casings, partition walls mounted in said pair of end casings and dividing each of the latter to provide a combustion chamber and a draft chamber, a pair of horizontally extending radiator manifolds supported by and between said pair of end casings and providing continuous passages, the inlet of each of said passages opening into the upper end of respective combustion chambers, and the outlet of each of said passages opening into the lower end of respective draft chambers, said combustion and draft chambers extending vertically throughout the height of said end casing.

7. In a heating apparatus, the combination of a pair of vertically disposed end casings, partition walls mounted in said end casings and dividing each of the latter to provide a combustion chamber and a draft chamber, and a plurality of separate compartments, a pair of radiator manifolds, each of said pair of radiator manifolds consisting of a plurality of horizontally extending conductor pipes arranged in superposed relation to each other, the ends of said conductor pipes opening into respective compartments to provide a continuous passage through each of said radiator manifolds, the inlets of said passages opening into the upper ends of respective combustion chambers, and the outlets of said passages opening into the lower ends of said draft chambers.

8. In a heating apparatus, the combination of a pair of vertically disposed end casings, partition walls mounted in said end casings and dividing each of the latter to provide a combustion chamber and a draft chamber, and a plurality of separate compartments, a pair of radiator manifolds, each of said pair of radiator manifolds consisting of a plurality of horizontally extending conductor pipes arranged in superposed relation to each other, the ends of said conductor pipes opening into respective compartments to provide a continuous passage through each of said radiator manifolds, the inlets of said passages opening into the upper ends of respective combustion chambers, and the outlets of said passages opening into the lower ends of said draft chambers, said combustion and draft chambers extending vertically throughout the height of said end casings.

In testimony whereof I affix my signature.

WILLIAM A. BOLLINGER.